United States Patent
Ban

(10) Patent No.: US 8,782,147 B2
(45) Date of Patent: Jul. 15, 2014

(54) CONCURRENT DELIVERY FOR MESSAGES FROM A SAME SENDER

(75) Inventor: Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 515 days.

(21) Appl. No.: 12/878,530

(22) Filed: Sep. 9, 2010

(65) Prior Publication Data

US 2012/0066313 A1 Mar. 15, 2012

(51) Int. Cl.
G06F 15/16 (2006.01)

(52) U.S. Cl.
USPC ............ 709/206; 709/250; 370/389; 370/390; 370/391; 370/392

(58) Field of Classification Search
USPC .................... 709/206, 250; 370/389–392
See application file for complete search history.

(56) References Cited

U.S. PATENT DOCUMENTS

| | | | |
|---|---|---|---|
| 6,182,120 B1 * | 1/2001 | Beaulieu et al. | 709/207 |
| 6,493,745 B1 * | 12/2002 | Cherian | 709/206 |
| 7,496,716 B2 * | 2/2009 | Dice et al. | 711/147 |
| 7,577,657 B2 * | 8/2009 | Earhart | 1/1 |
| 7,733,863 B2 * | 6/2010 | Ban | 370/392 |
| 7,921,227 B2 * | 4/2011 | Ban | 709/250 |
| 7,992,153 B2 * | 8/2011 | Ban | 719/313 |
| 8,132,174 B2 * | 3/2012 | Daum et al. | 718/102 |
| 2004/0202165 A1 * | 10/2004 | Aoki et al. | 370/392 |
| 2005/0102261 A1 * | 5/2005 | Todd | 707/1 |
| 2005/0149526 A1 * | 7/2005 | Wiser et al. | 707/8 |
| 2005/0198127 A1 * | 9/2005 | Helland et al. | 709/204 |
| 2006/0136367 A1 * | 6/2006 | Todd | 707/2 |
| 2006/0212450 A1 * | 9/2006 | Earhart | 707/8 |
| 2007/0198781 A1 * | 8/2007 | Dice et al. | 711/145 |
| 2008/0034379 A1 * | 2/2008 | Dale et al. | 719/321 |
| 2008/0298355 A1 * | 12/2008 | Ban | 370/389 |
| 2008/0298363 A1 * | 12/2008 | Ban et al. | 370/390 |
| 2008/0301244 A1 * | 12/2008 | Ban | 709/206 |
| 2008/0301706 A1 * | 12/2008 | Ban | 719/313 |
| 2008/0301709 A1 * | 12/2008 | Ban | 719/314 |
| 2010/0275035 A1 * | 10/2010 | Manabe | 713/189 |

* cited by examiner

*Primary Examiner* — Backhean Tiv
(74) *Attorney, Agent, or Firm* — Lowenstein Sandler LLP

(57) ABSTRACT

An apparatus and a method for processing messages. A transport protocol stack receives messages from senders. The transport protocol stack comprises a concurrent stack having an out of band thread pool and a non-out of band thread pool. A channel is formed with a thread from the non-out of band thread pool of the concurrent stack for each sender. Non-out of band messages are processed in parallel for each scope of an application with a non-out of band thread. Non-out of band messages pertains to processes of the application from a same sender. Processes from a scope of the application are unrelated to processes from another scope of the application. Non-out of band messages within a same scope are processed in a predefined order.

20 Claims, 7 Drawing Sheets

CONCURRENT DELIVERY FOR MESSAGES FROM A SAME SENDER

TECHNICAL FIELD

Embodiments of the present invention relate to computing systems, and more particularly, to parallel processing of messages.

BACKGROUND

Group communication protocol designed for multicast communication may be used to communicate messages between endpoints forming a group. Communication endpoints can be processes or objects, or any entity that can send and receive messages to and from a group.

Nevertheless, messages from different senders are conventionally processed in a First In First Out (FIFO) order in a single queue. The messages are processed sequentially in the order they were sent. A bottleneck may thus be formed since every message has to wait for its turn to be processed accordingly.

BRIEF DESCRIPTION OF THE DRAWINGS

Embodiments of the present invention is illustrated by way of example, and not by way of limitation, in the figures of the accompanying drawings and in which.

DETAILED DESCRIPTION

Described herein is an apparatus and a method for processing messages. A transport protocol stack receives messages from senders. In one embodiment, the transport protocol stack includes a concurrent stack having an out of band (OOB) thread pool and a non-out of band thread (non-OOB) pool. A channel is formed with a thread from the non-out of band thread pool of the concurrent stack for each sender. Non-out of band messages are processed in parallel for each scope of an application with a non-out of band thread. Packets marked as OOB are dispatched to the OOB thread pool. All other packets are dispatched to the "regular" (non-OOB) thread pool. OOB packets are processed independently from non-OOB packets. Non-OOB messages pertains to processes of the application from a same sender. Processes from a scope of the application are unrelated to processes from another scope of the application. Non-OOB messages within a same scope are processed in a predefined order.

Group Communication Architecture

Figure 1:
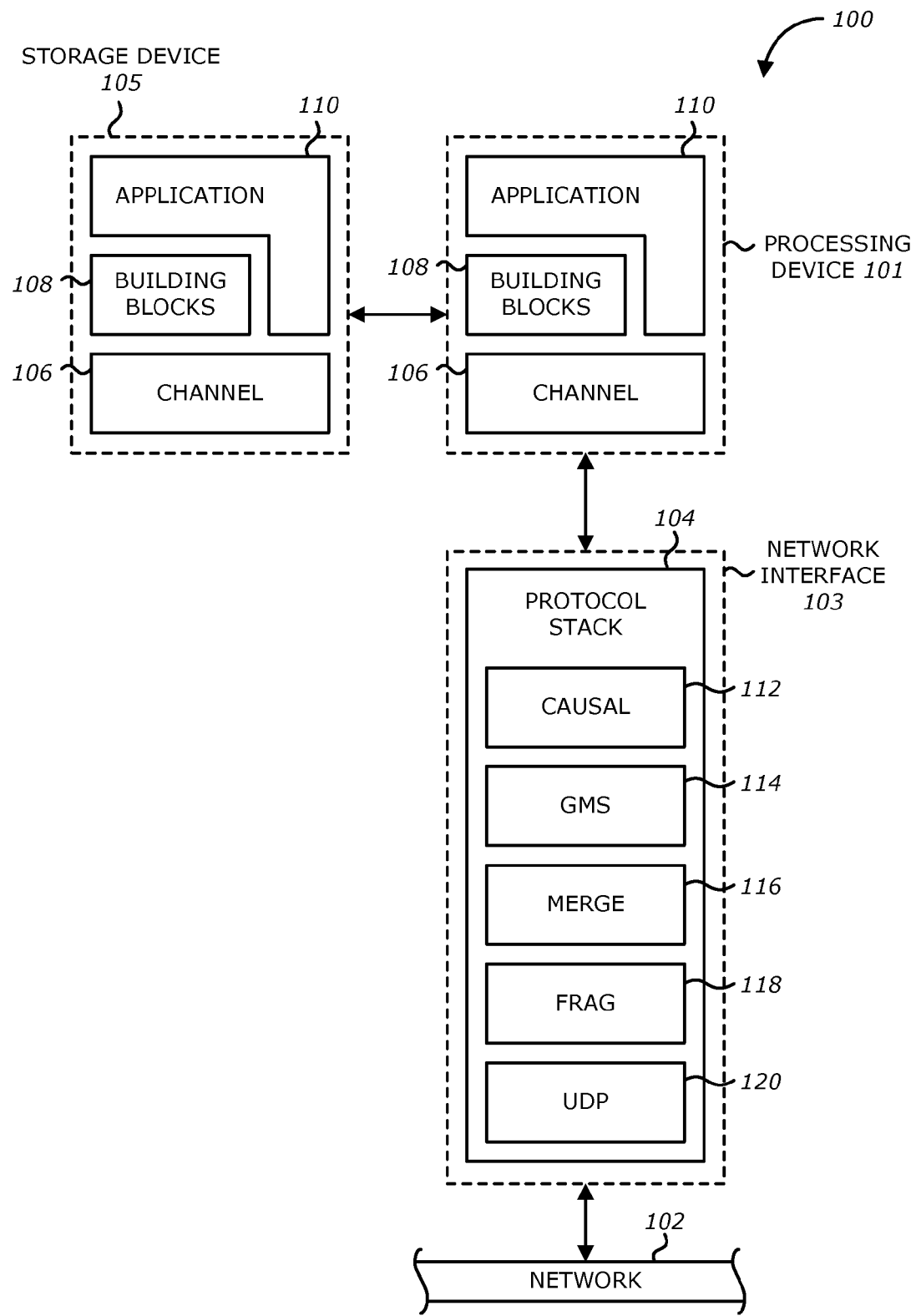
FIG. 1 is a block diagram illustrating one embodiment of a network architecture of a group communication in which embodiments of the present invention may be implemented.

FIG. 1 illustrates an exemplary network architecture of a group communication 100 in which embodiments of the present invention may operate. An example of such a group communication architecture is JGroups from Red Hat Inc.

A computer system 100, may be for example, a server, a client, or any other computing device configured to communicate with other computing devices. Computer system 100 includes a processing device 101 to generate processes from an application 110. Processing device 101 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device 101 is configured to generate processes for performing the operations and steps discussed herein with. In one embodiment, application 110 may be include hardware or software or a combination of both. In another embodiment, a storage device 105 stores program instructions corresponding to application 110 executable by processing device 101.

The processes can join a group, send messages to all members or single members and receive messages from members in the group. Computer system 100 keeps track of the members in every group, and notifies group members when a new member joins, or an existing member leaves or crashes.

A group can be identified by its name. Groups do not have to be created explicitly; when a process joins a non-existing group, that group will be created automatically. Member processes of a group can be located on the same host (computing system), within the same LAN (Local Area Network), or across a WAN (Wireless Area Network). A member can be part of multiple groups.

The group communication architecture may be composed of three parts: (1) a channel API 106 used by application programmers to build reliable group communication applications, (2) building blocks 108, which are layered on top of channel 106 and provide a higher abstraction level and (3) a protocol stack 104, which implements the properties specified for a given channel. In one embodiment, a network interface comprises the protocol stack 104. Processing device 101 communicates messages to network interface 103.

Network interface 103 provides an interface between processing device 101 and network 102. In one embodiment, network interface comprises a protocol stack 104.

Whenever application 110 sends a message, channel 106 passes the message on to protocol stack 104 that comprises several protocol modules 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 processes the message.

When application 110 connects to channel 106, protocol stack 104 will be started, and when it disconnects protocol stack 104 will be stopped. When channel 106 is closed, the corresponding protocol stack 104 will be destroyed, releasing its resources.

Channel

To join a group and send messages, a process has to create a channel 106 and connect to it using the group name (all channels with the same name form a group). Channel 106 is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. As such, channels can know who the other members are in the same group: a list of member addresses can be retrieved from any channel. This list is called a view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

A listener callback can be registered with Channel 106. Whenever a message is received, that callback (receive( )) is called.

Channel 106 may be implemented over a number of alternatives for group transport. Therefore, a channel is an abstract class, and concrete implementations are derived from it, e.g. a channel implementation using its own protocol stack, or others using existing group transports such as Jchannel. Applications only deal with the abstract channel class, and the actual implementation can be chosen at startup time.

In one embodiment, the properties for a channel may be specified in a colon-delimited string format. When creating a channel (JChannel) a protocol stack will be created according to these properties. All messages will pass through this stack, ensuring the quality of service specified by the properties string for a given channel.

Building Blocks

Channel 106 provides asynchronous message sending/reception, similar to UDP. A message sent is essentially put on network 102 and the send( ) method will return immediately. Conceptual requests, or responses to previous requests, are received in undefined order, and application 110 has to take care of matching responses with requests.

Also, application 110 can actively retrieve messages from a channel (pull-style); it is not notified when a message has been received. Application 110 can also have a pull-style message reception that often needs another thread of execution, or some form of event-loop, in which a channel is periodically polled for messages.

Group offers building blocks 108 that provide more sophisticated APIs on top of a Channel. Building blocks 108 either create and use channels 106 internally, or require an existing channel to be specified when creating a building block 108. Applications 110 communicate directly with the building block 108, rather than channel 106. Building blocks are intended to save the application programmer from having to write tedious and recurring code, e.g. request-response correlation.

Protocol Stack

In one embodiment, JGroups provides its own channel based on a Java protocol stack. This protocol stack may contain a number of protocol layers in a bidirectional list. As illustrated in FIG. 1, protocol stack 104 can include the following procotols: CAUSAL 112, GMS 114, MERGE 116, FRAG 118, UDP 120.

All messages sent and received over the channel 106 have to pass through protocol stack 104. Every layer may modify, reorder, pass or drop a message, or add a header to a message. For example, a fragmentation layer might break up a message into several smaller messages, adding a header with an id to each fragment, and re-assemble the fragments on the receiver's side.

The composition of protocol stack 104, i.e. its layers, is determined by the creator of the channel 106: a property string defines the layers to be used (and the parameters for each layer). This string might be interpreted differently by each channel implementation; in JChannel it is used to create the stack, depending on the protocol names given in the property.

Knowledge about protocol stack 104 is not necessary when only using channels 106 in application 110. However, when application 110 wishes to ignore the default properties for protocol stack 104, and configure their own stack, then knowledge about what the individual layers are supposed to do is needed. Although it is possible to stack any layer on top of each other (they all have the same interface), this does not make sense semantically in most cases.

Message

Figure 2:
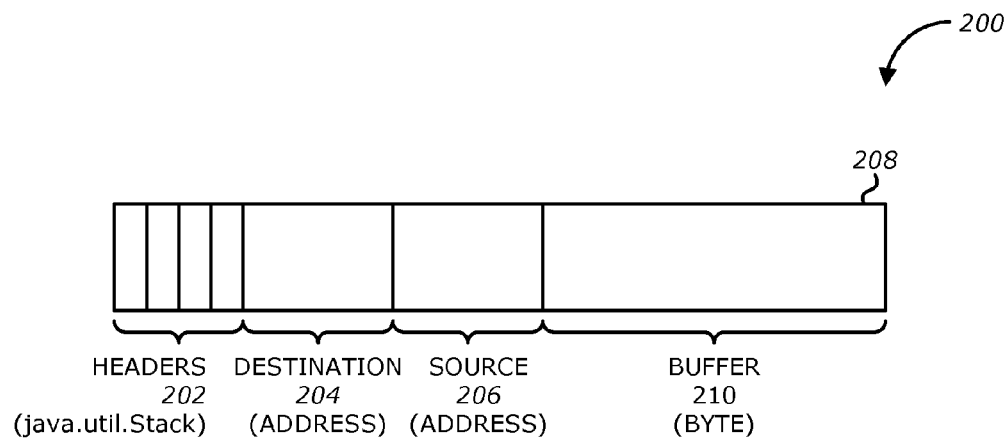
FIG. 2 is a block diagram illustrating one embodiment of a structure of a message.

Data is sent between members in the form of messages. A message can be sent by a member to a single member, or to all members of the group of which the channel is an endpoint. FIG. 2 illustrates an example of a structure of a message 200. In one embodiment, message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader( ), and removeHeader( ) of message 200 can be used to manipulate headers 202.

Destination address 204 may include the address of the receiver. If null, the message will be sent to all current group members.

Source address 206 may include the address of a sender. It can be left null, and will be filled in by the transport protocol (e.g. UDP) before the message is put on the network 102.

One byte of the message 200 may be used for flags 208. An example of a flag is OOB.

Payload 210 may include the actual data (as a byte buffer). The message class contains convenience methods to set a serializable object and to retrieve it again, using serialization to convert the object to/from a byte buffer.

Message 200 may be similar to an IP packet and consists of the payload (a byte buffer) and the addresses of the sender and receiver (as addresses). Any message put on the network 102 can be routed to its destination (receiver address), and replies can be returned to the sender's address.

A message does not need to fill in the sender's address when sending a message; this is done automatically by the protocol stack before a message is put on the network. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members would look like this:

Message msg=new Message(null, null, "Hello".getBytes( ));
channel.send(msg);

Channel States

Figure 3:
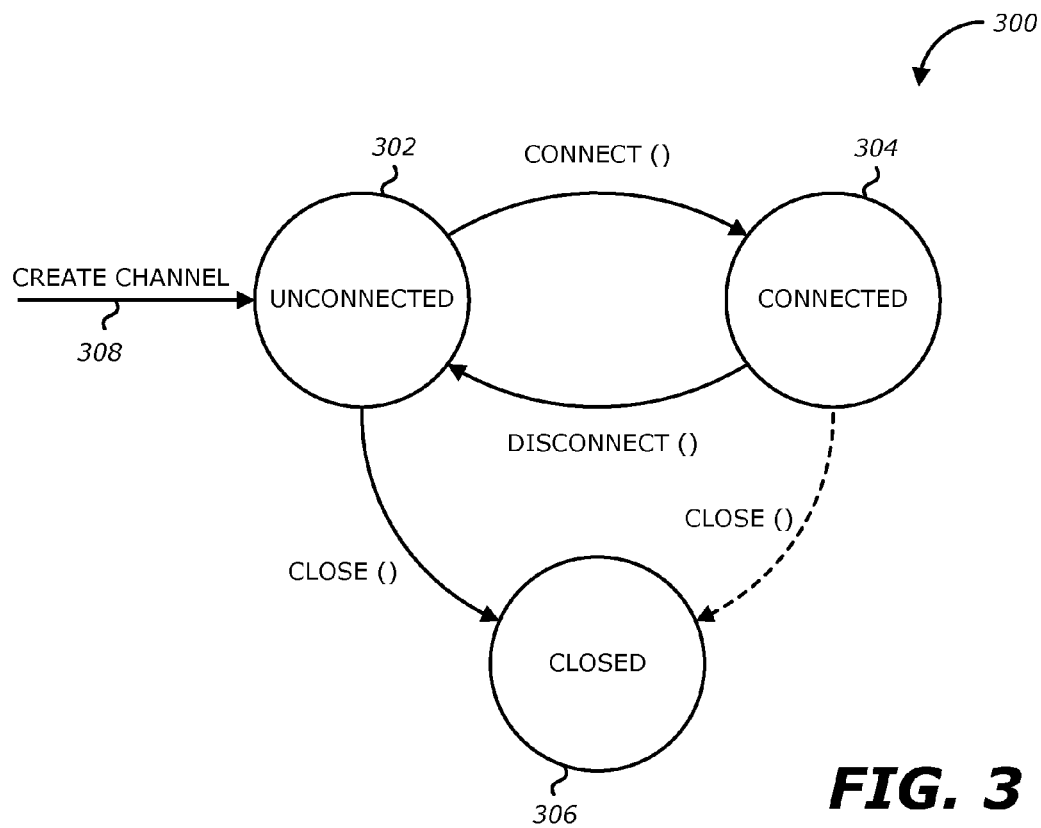
FIG. 3 is a block diagram illustrating one embodiment of channel states.

FIG. 3 illustrates an example of a state transition diagram 300. In order to join a group and send messages, a process has to create a channel. A channel is like a socket. When a client connects to a channel, it gives the name of the group it would like to join. Thus, a channel is (in its connected state) always associated with a particular group. The protocol stack takes care that channels with the same group name find each other: whenever a client connects to a channel given group name G, then it tries to find existing channels with the same name, and joins them, resulting in a new view being installed (which contains the new member). If no members exist, a new group will be created.

When a channel is first created at 308, it is in the unconnected state 302. An attempt to perform certain operations which are only valid in the connected state (e.g. send/receive messages) will result in an exception. After a successful connection by a client, it moves to the connected state 304. Now channels will receive messages, views and suspicions from other members and may send messages to other members or to the group. Getting the local address of a channel is guaranteed to be a valid operation in this state (see below). When the channel is disconnected, it moves back to the unconnected state 302. Both a connected and unconnected channel may be closed 306, which makes the channel unusable for further operations. Any attempt to do so will result in an exception. When a channel is closed directly from a connected state, it will first be disconnected, and then closed.

Concurrent Stack

Figure 4:
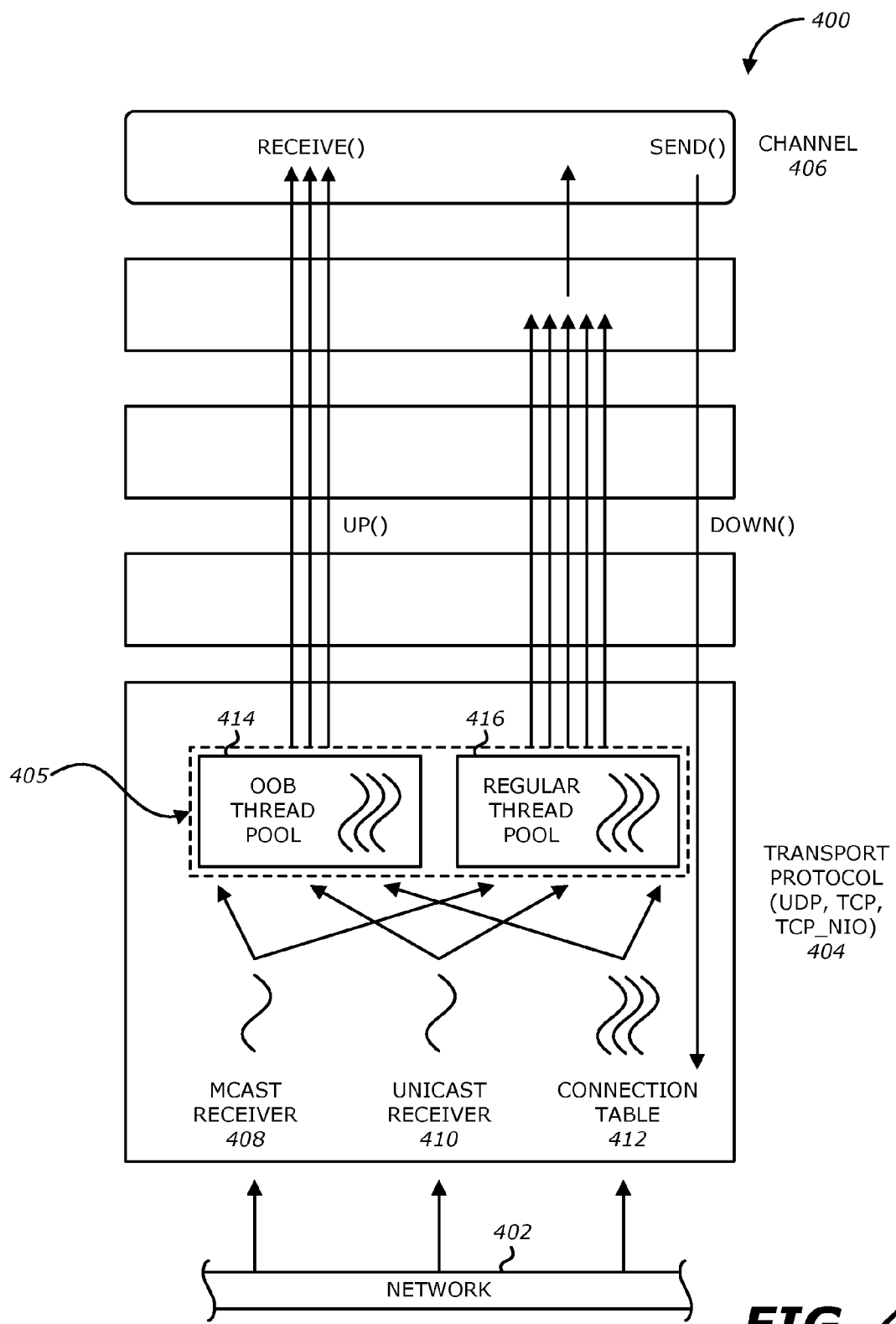
FIG. 4 is a block diagram illustrating one embodiment of a concurrent stack.

FIG. 4 illustrates one embodiment of an architecture 400 of a concurrent stack 405. As previously discussed, channel 406 communicate with transport protocol 404 to a network 402. However, transport protocol 404 may include the following protocols: TP, with subclasses UDP, TCP and TCP_NIO. Therefore, to configure the concurrent stack, the user has to modify the config for (e.g.) UDP in the XML file.

Concurrent stack 405 consists of two thread pools: an out-of-band (OOB) thread pool 414 and a non-OOB thread pool 416. Packets are received from Multicast receiver 408, Unicast receiver 410, or a Connection Table 412 (TCP, TCP_NIO). Packets marked as OOB (with Message.setFlag(Message.OOB)) are dispatched to the OOB thread pool 414, and all other packets are dispatched to the regular (non-OOB) thread pool 416. OOB packets are processed independently from non-OOB packets.

When a thread pool is disabled, then the thread of the caller (e.g. multicast or unicast receiver threads or the ConnectionTable) is used to send the message up the stack and into the application. Otherwise, the packet will be processed by a thread from the thread pool, which sends the message up the stack. When all current threads are busy, another thread might be created, up to the maximum number of threads defined. Alternatively, the packet might get queued up until a thread becomes available.

The advantage of using a thread pool is that the receiver threads does not have to do de-serialization of a message and therefore can remove packets from a socket, resulting in fewer dropped packets (and costly retransmission) due to full buffers in sockets.

In contrast, previously all messages received were processed by a single thread, even if the messages were sent by different senders. For instance, if sender A sent messages 1, 2 and 3, and B sent message 4 and 5, and if A's messages were all received first, then B's messages 4 and 5 could only be processed after messages 1-3 from A were processed.

Now, messages from different senders can be processed in parallel, e.g. messages 1, 2 and 3 from A can be processed by one thread from the thread pool and messages 4 and 5 from B can be processed on a different thread. As a result, a speedup of almost N for a cluster of N if every node is sending messages may be obtained. The thread pool may be configured to have at least N threads.

Scopes

Figure 5:
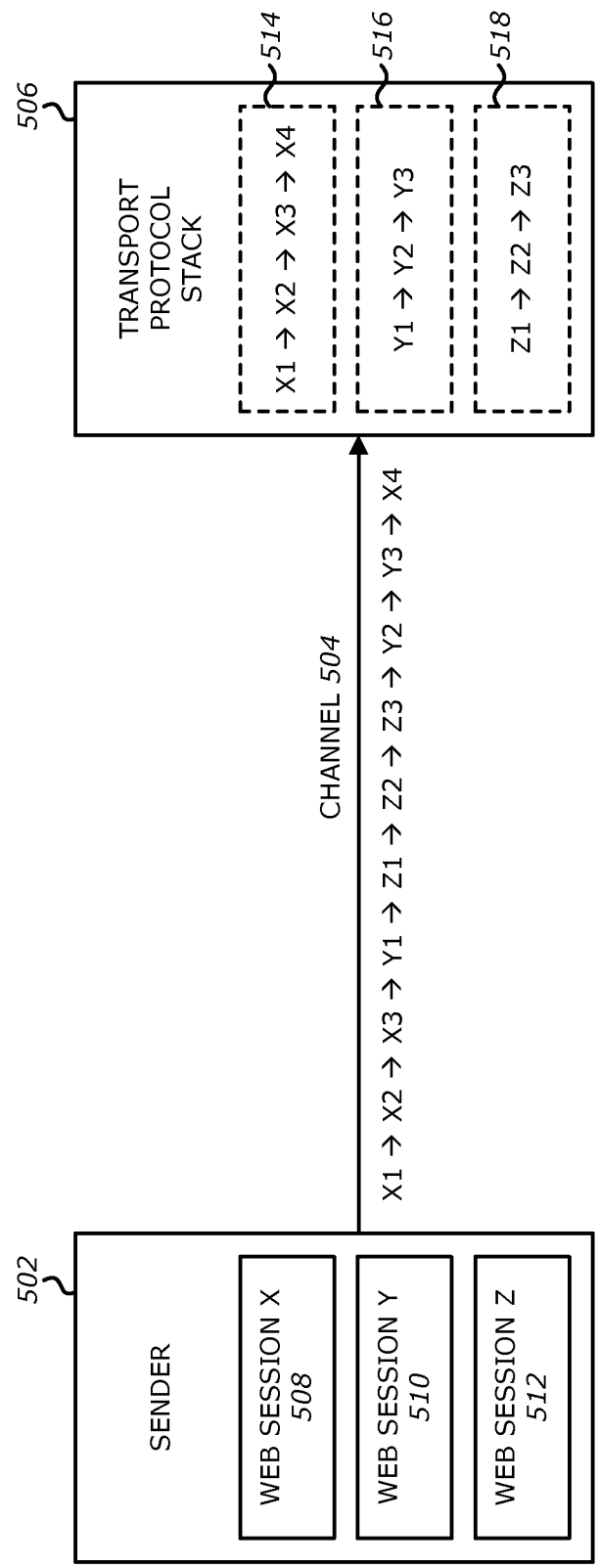
FIG. 5 is a block diagram illustrating one embodiment of a method for concurrently processing messages from a sender.

FIG. 5 is a block diagram illustrating one embodiment of a method for concurrently processing messages from a sender 502. As previously described, concurrent stack 405 allows for messages from different senders to be delivered concurrently. But non-OOB messages from the same sender 502 are delivered in the order in which they are sent. However this is not sufficient for some types of applications.

For example, in the case where an application which replicates HTTP web sessions X 508, web session Y 510, and web session Z 512 at a sender 502. Updates to these web sessions are delivered through channel 504 in the order in which they are performed. For example, X1, X2, X3, Y1, Z1, Z2, Z3, Y2, Y3, and X4 (each representing a corresponding web session update).

Previously, this used to mean that update Y1 has to wait until updates X1, X2, and X3 have been delivered. If these updates take time (lock acquisition or deserialization), then all subsequent messages are delayed by the sum of the times taken by the messages ahead of them in the delivery order.

Also, the use of OOB message to deliver messages concurrently does not guarantee that the order of updates being delivered within a thread. For example, if messages X1, X2, and X3 are marked as OOB messages and are sent in the order X1, X2, X3. Their order would be undefined since they are all marked as OOB messages. For example, X3 could be delivered before X2.

In accordance with one embodiment, transport protocol stack 506 provides for concurrent delivery messages from the same sender for each web session. Because updates to different web sessions are completely unrelated to one another, they should be delivered concurrently. For instance, a modification to web session X 508 should not have any effect on web session Y 510 and web session Z 512. Therefore updates to web session X 508, web session Y 510, and web session Z 512 can be delivered concurrently.

In the example of FIG. 5, web updates X1, Y1, and Z1 are delivered concurrently at transport protocol stack 506 for their respective web session. Furthermore, messages pertaining to a given web session are all delivered concurrently between sessions and ordered within a given web session. As such, within each web session 514, 516, 518, the corresponding web updates are delivered in the order they were sent (e.g., X1, X2, X3, and X4 for web session 514, Y1, Y2, and Y3 for web session 516, and Z1, Z2, and Z3 for web session 518). In one embodiment, the group of web updates for a corresponding web session may be referred to as a scope within transport protocol stack 506.

Figure 6:
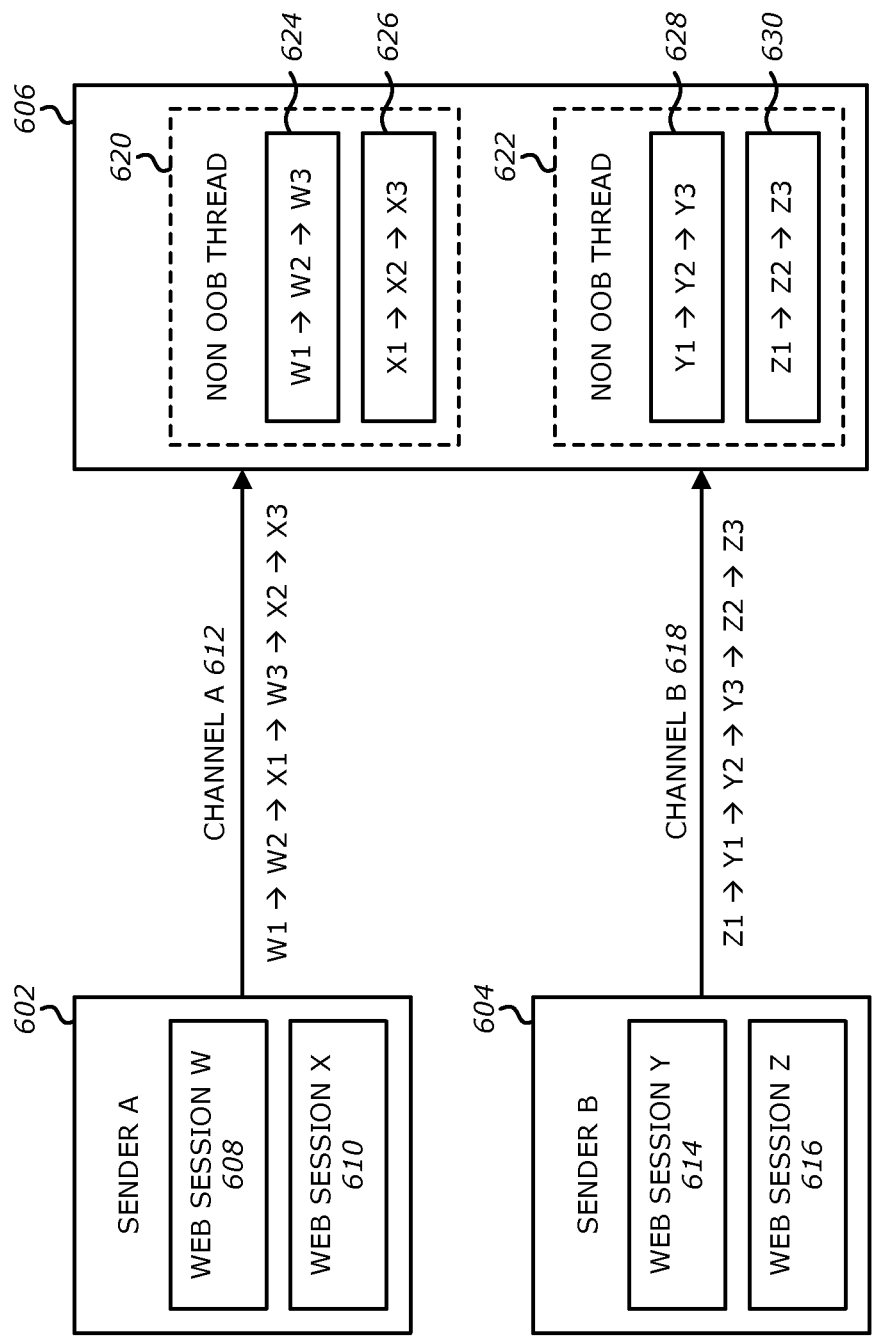
FIG. 6 is a block diagram illustrating one embodiment of a method for concurrently processing messages from two or more senders.

FIG. 6 is a block diagram illustrating one embodiment of a method for concurrently processing messages at transport protocol 606 from two senders 602 and 604. Each sender generates their corresponding channel (e.g. channel A 612 for sender A 602, channel B 618 for sender B 604).

FIG. 6 illustrates an application where HTTP web sessions are replicated. At sender A 602, web session W 608, and web session X 610 are generated and updated. At sender B 604, web session Y 614, and web session Z 616 are generated and updated. Updates to these web sessions are delivered through their corresponding channels 612, 618 in the order in which they are performed. For example, W1, W2, X1, W3, X2, and X3 for channel A 612, and Z1, Y1, Y2, Y3, Z2, and Z3 for channel B 618 (each representing a corresponding web session update).

A non-OOB thread 620 for channel A 612 allows concurrent processing of web session updates W and X. In other words, web session updates 624 and 626 operate in parallel. However, within each web session, the web session updates are processed in the order they are received (W1, W2, W3 for web session W 608 within scope 624, and X1, X2, X3 for web session X 610 within scope 626). As such, for example, X1 does not have to wait for W2 to be processed.

Similarly another non-OOB thread 622 for channel B 618 allows concurrent processing of web session updates Y and Z. In other words, web session 628 and 630 operate in parallel. However, within each web session, the web session updates are processed in the order they are received (Y1, Y2, Y3 for web session Y 614 within scope 628, and Z1, Z2, Z3 for web session Z 616 within scope 630). As such, for example, Z2 does not have to wait for Y3 to be processed.

In one embodiment, non-OOB threads 624, 626, 628, 630 are processed concurrently.

Figure 7:
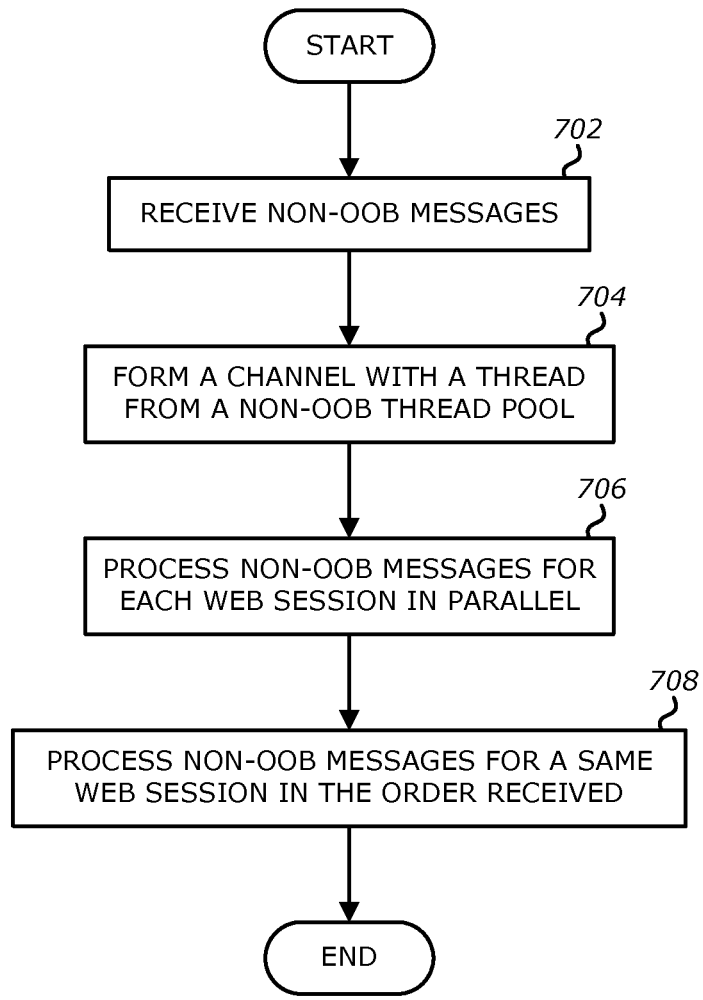
FIG. 7 is a flow diagram illustrating one embodiment of a method for concurrently processing messages.

FIG. 7 is a flow diagram illustrating one embodiment of a method for concurrently processing messages. At 702, a transport protocol stack receives messages from several senders. As previously described, the transport protocol stack comprises a concurrent stack including an out of band thread pool and a non-out of band thread pool. At 704, a channel is formed with a thread from the non-out of band thread pool of the concurrent stack for each sender (assuming the messages are marked as non-OOB, or not marked with OOB). At 706, the non-out of band messages are processed in parallel for each web session with their corresponding thread for each sender. Non-out of band messages pertain to several web sessions from a same sender. At 708, messages pertaining to a same web session are processed within each web session in a predefined order (e.g. the order they are received) since each web session is unrelated to another web session from the same sender.

In another embodiment, as illustrated in FIG. 6, non-out of band messages from different senders are processed in parallel with their corresponding thread. As such, messages within a scope of each web session from the same sender are processed with the corresponding thread in the order the messages are received for the corresponding web session.

Figure 8:
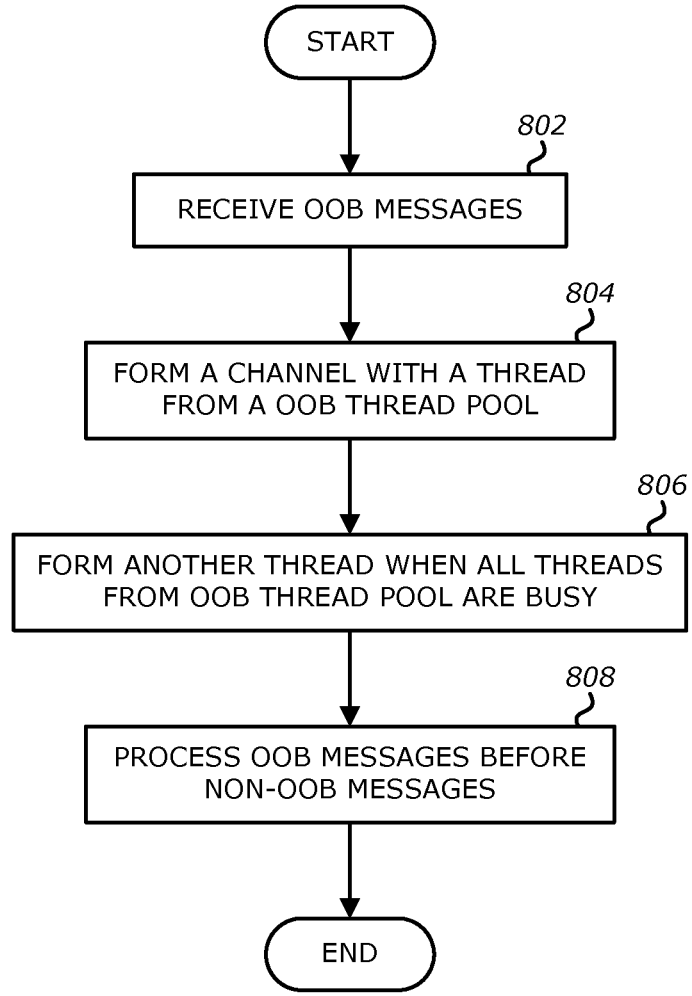
FIG. 8 is a flow diagram illustrating one embodiment of a method for processing Out of Band messages.

As previously described, messages marked as non-out of band are processed with the non-out of band thread pool. FIG. 8 illustrates a flow diagram for processing OOB messages. At 802, OOB messages are received. At 804, a channel is formed with a thread from OOB thread pool. OOB messages marked as out of band are processed with the OOB thread pool. At 806, in another embodiment, another thread is formed when all threads from the OOB thread pool are busy. At 808, messages marked as Out of Band are processed with the Out of Band thread pool before processing all other messages with the non-out of band thread pool.

In another embodiment, the network architecture of group communication 100 illustrated in FIG. 1 includes a storage device 105 coupled to processing device 101. Storage device 105 stores instructions for application 110, building blocks 108, and channel API 106. Storage device 105 may include a computer-readable storage memory. While the computer-readable storage medium is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "forming" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device, messages from a plurality of senders at a transport protocol stack of a network interface of a computer system, the transport protocol stack comprising a concurrent stack comprising an out of band thread pool and a non-out of band thread pool;
    for each sender of the plurality of senders, forming a channel associated with the sender;
    for each channel, associating a thread from the non-out of band thread pool of the concurrent stack with the channel; and
    processing, by each thread, non-out of band messages from each scope of an application independently from and concurrently with non-out of band messages from other scopes of the application at the thread, the non-out of band messages pertaining to a plurality of processes of the application sent from the sender associated with the channel of the thread, wherein processes from a scope of the application are unrelated to processes from another scope of the application, and wherein the non-out of band messages within a same scope are processed in a predefined order.

2. The method of claim 1 further comprising:
    processing non-out of band messages from different senders in parallel with corresponding threads, wherein messages within a scope of a web session from the same sender are processed with the corresponding thread in the order the messages are received for the corresponding web session.

3. The method of claim 2 further comprising:
    processing messages marked as non-out of band with the non-out of band thread pool; and
    processing messages marked as out of band with the out of band thread pool,
    wherein messages marked as out of band are processed with the out of band thread pool before processing all other messages with the non-out of band thread pool.

4. The method of claim 1 wherein the non-out of band messages from each scope of an application are processed in parallel with one another.

5. The method of claim 1 further comprising:
    forming another thread to process messages marked as out of band when all threads from the out of band thread pool are busy.

6. The method of claim 5 further comprising:
    processing messages marked as out of band for each sender with a thread from the out of band thread pool of the transport protocol stack.

7. The method of claim 6 wherein the thread sends the messages up the transport protocol stack to a corresponding channel of the channel layer, a building block layered on top of the channel layer, and an application programming interface layered on top of the building block, and wherein the transport protocol stack further comprises a User Datagram Protocol (UDP), a Transmission Control Protocol (TCP), the UDP comprising a multicast receiver and a unicast receiver, the Transmission Control Protocol (TCP) comprising a connection table.

8. A non-transitory computer-readable storage medium, having instructions stored therein, which when executed, cause a processing device to perform operations comprising:
    receiving, by the processing device, messages from a plurality of senders at a transport protocol stack of a network interface of a computer system, the transport protocol stack comprising a concurrent stack comprising an out of band thread pool and a non-out of band thread pool;
    for each sender of the plurality of senders, forming a channel associated with the sender;
    for each channel, associating a thread from the non-out of band thread pool of the concurrent stack with the channel; and
    processing, by each thread, non-out of band messages from each scope of an application independently from and concurrently with non-out of band messages from other scopes of the application at the thread, the non-out of band messages pertaining to a plurality of processes of the application sent from the sender associated with the channel of the thread, wherein processes from a scope of the application are unrelated to processes from another scope of the application, and wherein the non-out of band messages within a same scope are processed in a predefined order.

9. The non-transitory computer-readable storage medium of claim 8 wherein the operations further comprise:
    processing non-out of band messages from different senders in parallel with corresponding threads, wherein messages within a scope of each web session from the same sender are processed with the corresponding thread in the order the messages are received for the corresponding web session.

10. The computer-readable storage medium of claim 9 wherein the operations further comprise:
    processing messages marked as non-out of band with the non-out of band thread pool; and
    processing messages marked as out of band with the out of band thread pool,
    wherein messages marked as out of band are processed with the out of band thread pool before processing all other messages with the non-out of band thread pool.

11. The non-transitory computer-readable storage medium of claim 10 wherein the non-out of band messages from each scope of an application are processed in parallel with one another.

12. The non-transitory computer-readable storage medium of claim 8 wherein the operations further comprise forming another thread to process messages marked as out of band when all threads from the out of band thread pool are busy.

13. The non-transitory computer-readable storage medium of claim 12 wherein the operations further comprise processing messages marked as out of band for each sender with a thread from the out of band thread pool of the transport protocol stack.

14. The non-transitory computer-readable storage medium of claim 13 wherein the thread sends the messages up the transport protocol stack to a corresponding channel of the channel layer, a building block layered on top of the channel layer, and an application programming interface layered on top of the building block, and wherein the transport protocol stack further comprises a User Datagram Protocol (UDP), a Transmission Control Protocol (TCP), the UDP comprising a multicast receiver and a unicast receiver, the Transmission Control Protocol (TCP) comprising a connection table.

15. A computer system comprising:
a storage device comprising instructions for an application and a channel application programming interface (API) to receive and send messages;
a processing device coupled to the storage device, the processing device to execute the instructions for the application and the channel API; and
a network interface coupled to the processing device, the network interface comprising a building block layer, a channel layer coupled to the building block layer; and a transport protocol stack coupled to the channel layer to implement properties specified by the channel layer, the transport protocol stack comprising a multicast receiver, a unicast receiver, a connection table, and a concurrent stack consisting of comprising an out of band thread pool and a non-out of band thread pool;
wherein the channel API is to receive messages from a plurality of senders at the transport protocol stack, the transport protocol stack is to:
for each sender of the plurality of senders, form a channel associated with the sender; and
for each channel, associate a thread from the non-out of band thread pool of the concurrent stack with the channel; and
wherein the transport protocol stack is to process, by each thread, non-out of band messages from each scope of an application independently from and concurrently with non-out of band messages from other scopes of the application at the thread, the non-out of band messages pertaining to a plurality of processes of the application sent from the sender associated with the channel of the thread, wherein processes from a scope of the application are unrelated to processes from another scope of the application, and wherein the non-out of band messages within a same scope are processed in a predefined order.

16. The computer system of claim 15 wherein the transport protocol stack is to process non-out of band messages from different senders in parallel with corresponding threads, wherein messages within a scope of each web session from the same sender are processed with the corresponding thread in the order the messages are received for the corresponding web session.

17. The computer system of claim 16 wherein the transport protocol stack is to processing messages marked as non-out of band with the non-out of band thread pool, to process messages marked as out of band with the out of band thread pool, wherein messages marked as out of band are processed with the out of band thread pool before processing all other messages with the non-out of band thread pool.

18. The computer system of claim 15 wherein the non-out of band messages from each scope of an application are processed in parallel with one another.

19. The computer system of claim 15 wherein the transport protocol stack is to form another thread to process messages marked as out of band when all threads from the out of band thread pool are busy.

20. The computer system of claim 19 wherein the transport protocol stack is to process messages marked as out of band for each sender with a thread from the out of band thread pool of the transport protocol stack.

* * * * *